United States Patent
Yasui et al.

(10) Patent No.: US 6,858,319 B2
(45) Date of Patent: Feb. 22, 2005

(54) MAGNETIC RECORDING MEDIUM INCLUDING ALUMINUM LAYER HAVING HOLES AND PRODUCTION METHOD THEREOF

(75) Inventors: Nobuhiro Yasui, Kanagawa (JP); Tohru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 09/964,781

(22) Filed: Sep. 28, 2001

(65) Prior Publication Data

US 2002/0086185 A1 Jul. 4, 2002

(30) Foreign Application Priority Data

Sep. 29, 2000 (JP) .................................. 2000-298785
Sep. 27, 2001 (JP) .................................. 2001-296766

(51) Int. Cl.⁷ ............................................. G11B 5/738
(52) U.S. Cl. ..................... 428/611; 428/640; 428/652; 428/156; 428/323; 428/409; 428/694 TR; 428/694 TS
(58) Field of Search ................................ 428/611, 640, 428/652, 156, 323, 409, 694 TR, 694 TS, 637, 668, 674, 675, 670, 678, 694 T, 692, 693, 694 R, 694 ML, 472, 469, 131, 134, 135, 209, 210, 694 SG (56) References Cited

U.S. PATENT DOCUMENTS

| 5,363,794 A | * | 11/1994 | Lairson et al. ................. 117/7 |
| 5,748,421 A | | 5/1998 | Taki et al. ................... 360/135 |
| 6,139,713 A | | 10/2000 | Masuda et al. ............. 205/206 |
| 6,248,416 B1 | * | 6/2001 | Lambeth et al. ........... 428/65.3 |
| 6,428,906 B1 | * | 8/2002 | Wong et al. ................ 428/611 |
| 6,602,620 B1 | * | 8/2003 | Kikitsu et al. .......... 428/694 T |
| 6,610,463 B1 | | 8/2003 | Ohkura et al. ............. 430/322 |
| 6,641,934 B1 | * | 11/2003 | Suzuki et al. ........... 428/694 TS |
| 2002/0012816 A1 | * | 1/2002 | Shimizu et al. ....... 428/694 TM |
| 2002/0071214 A1 | * | 6/2002 | Belser ........................ 360/135 |
| 2002/0098381 A1 | * | 7/2002 | Coffey et al. ............ 428/694 T |
| 2004/0001964 A1 | | 1/2004 | Ohkura et al. ............... 428/596 |
| 2004/0048092 A1 | * | 3/2004 | Yasui et al. ................. 428/642 |

FOREIGN PATENT DOCUMENTS

| EP | 1020545 A | 7/2000 | ........... C25D/11/04 |
| FR | 1534535 | 7/1968 | ........... G11C/11/00 |
| JP | 01-176318 A | * 7/1989 | ........... G11B/5/66 |
| JP | 7-73429 | 3/1995 | |
| JP | 10-121292 | 5/1998 | |
| JP | 11-224422 | 8/1999 | |
| WO | WO 99/24973 | 5/1999 | |

OTHER PUBLICATIONS

Masuda, et al; "Fabrication of Gold Nanodot Array Using Anodic Porous Alumina as an Evaporation Mask"; J. Jour. App. Phys. vol. 35, No. 2 (1996) L 126–L 129.

Furneaux, et al.; The formation of controlled–porosity membranes from anodically oxidized aluminium; Nature vol. 337, No. 6203, (1989) 147–149.

Masuda, H.; "Solid State Physics", vol. 31, No. 5 (1996) 493–499.

Arai, et al.; "Magnetic Properties of Co and Co–Fe Electrodeposited Alumite Films"; IEEE Trans. on Magnetics, vol. 26, No. 5 (1990) 1635–1637.

* cited by examiner

Primary Examiner—Kevin M. Bernatz
(74) Attorney, Agent, or Firm—Fitzpatrick, Cella, Harper & Scinto (57) ABSTRACT

To provide a magnetic recording medium with good record and reproduction characteristics. In the magnetic recording medium having an anodic oxidized alumina nanohole film filled with a magnetic substance, the anodic oxidized alumina nanohole film 13 is formed on a substrate 16 with at least one base electrode layer 15 sandwiched therebetween, the base electrode layer 15 is a film that has fcc structure and whose (111) face is oriented in the direction perpendicularly to a substrate, and the fillers 14 in the alumina nanoholes 10 have hcp structure and include hard magnetic substance whose principal component is Co and whose c-axis is perpendicular to the substrate.

1 Claim, 6 Drawing Sheets

MAGNETIC RECORDING MEDIUM INCLUDING ALUMINUM LAYER HAVING HOLES AND PRODUCTION METHOD THEREOF

BACKGROUND OF THE INVENTION

1. Field of the Invention

The present invention relates to a magnetic recording medium and a production method thereof, and in particular, to a perpendicular magnetic recording medium, where reproduction noise is low and high density recording is possible, and a production method thereof.

2. Related Background Art

Increase in information recording capacity of magnetic disk units and the like is desired with sharp increase of information processing in recent years. In particular in hard disk drives, an information-recording amount per unit area is now increasing with an annual rate of 60% or more. The information-recording amount is desired to continue to increase, and miniaturization and a higher density are also desired for use as a portable recording device and the like.

In a magnetic recording medium for a hard disk drive used conventionally, a longitudinal magnetic recording method is adopted, and magnetization is recorded in parallel to a disk surface. In this longitudinal magnetic recording method, it is necessary to thin a magnetic recording layer to generate a magnetic field upward from the medium so as to suppress an anti-magnetic field in each magnetic domain and to detect a magnetization state, with high densification. Therefore, a volume of a magnetic particle becomes extremely small, resulting in the tendency of easily bringing a superparamagnetic effect. Thus, it may happen that energy stabilizing a magnetizing direction becomes lower than thermal energy, magnetization recorded changes with time, and finally record is erased. For this reason, in recent years, researches shifting to perpendicular magnetic recording methods where the film thickness of a recording layer can be made to be large have been active instead of the longitudinal magnetic recording method.

As media for perpendicular magnetic recordings, a monolayer type of medium having a single layer of magnetic recording layer, and a two-layer type of medium having a hard magnetic recording layer on a soft magnetic layer with high permeability that is a backing layer are proposed. In the case of the latter, a magnetic circuit is constituted, the magnetic circuit where a magnetic field, which is concentrated from a perpendicular magnetic head to the recording layer, is returned to the head through horizontally passing the soft magnetism layer. Although effects of increasing a recording magnetic field and enhancing record and reproduction are expected in this two-layer type of medium having the backing layer, it is also pointed out that there is a problem that a reversal of magnetization of the soft magnetic layer, and noise accompanying domain wall transfer, etc. are caused.

Figure 2A:
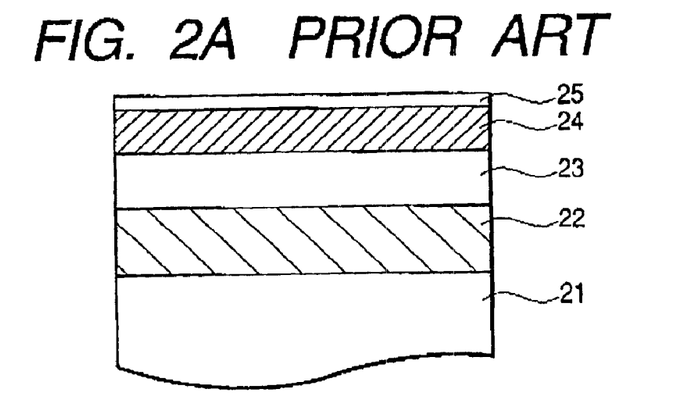
FIGS. 2A and 2B are schematic diagrams showing an example of conventional technology in a magnetic recording medium.
Figure 2B:
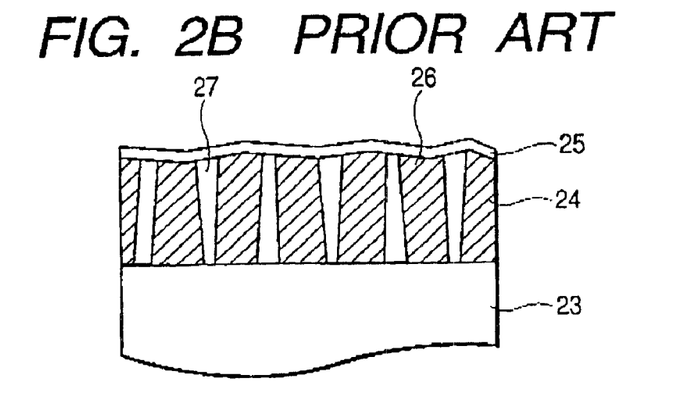

This will be described in detail below with using an explanatory diagram of a conventional perpendicular magnetic recording medium in FIGS. 2A and 2B. It is possible to use a glass substrate, an aluminum substrate, a carbon substrate, a plastic substrate, a Si substrate, etc. can be used as a substrate 21. In the case of the aluminum substrate, in order to secure hardness, as shown in FIGS. 2A and 2B, a NiP layer 22 is produced in many cases as a base layer by plating etc. As a backing layer 23, a NiFe alloy (permalloy) with high permeability etc. is used at the thickness of several $\mu$m to several tens $\mu$m. Generally, as a recording layer 24, a Co—Cr alloy is used. When being produced by sputtering, a recording layer 24 grows up in a state where a core portion 26 with much Co composition, and a shell portion 27 with comparatively much Cr composition around the core portion 26 are separated as shown in FIG. 2B. The core portion 26 has the hexagonal close-packed structure (hereinafter hcp structure) having an approximately cylindrical shape, and becomes hard magnetic to become a recording portion. The shell portion 27 becomes soft magnetic or non-magnetic due to much Cr composition, and also plays the role of weakening the interaction between adjacent core portions. In the core portion 26, since the c-axis faces in the direction perpendicularly to the substrate, magnetization turns in the direction perpendicularly to the substrate due to the action of crystal magnetic anisotropy. Ta, Pt, Rh, Pd, Ti, Nb, Ht, and the like are added besides Co—Cr in the above-described recording layer 24.

In addition, although this is not shown in FIGS. 2A and 2B, a base layer is formed between the recording layer 24 and backing layer 23 in order to enhance the crystallinity of the recording layer 24. Alternatively, in order to weaken a little the magnetic bond of the recording layer 24 and backing layer 23, a base layer such as an oxide layer is formed (refer to Japanese Patent Application Laid-open No. 7-73429).

It is common to thinly form a protection layer 25 on its surface, and carbon, carbide, nitride, and the like have been examined as materials.

Next, since the present invention uses anodic oxidized alumina having fine pores, an anodic oxide film and an alumite magnetic substance with the anodic oxidized film will be described in detail below with using FIGS. 3A and 3B. The term "anodic oxidized alumina" means a product through an anodic oxidization of aluminum.

Figure 3A:
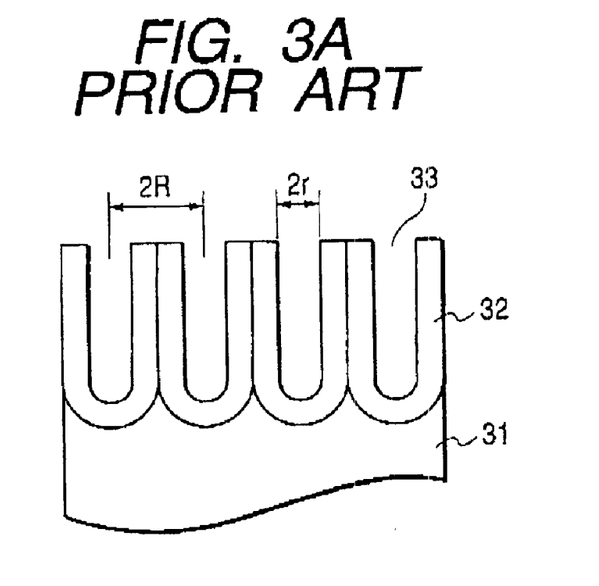
FIGS. 3A and 3B are schematic diagrams showing an example of conventional technology in alumina nanoholes.
Figure 3B:
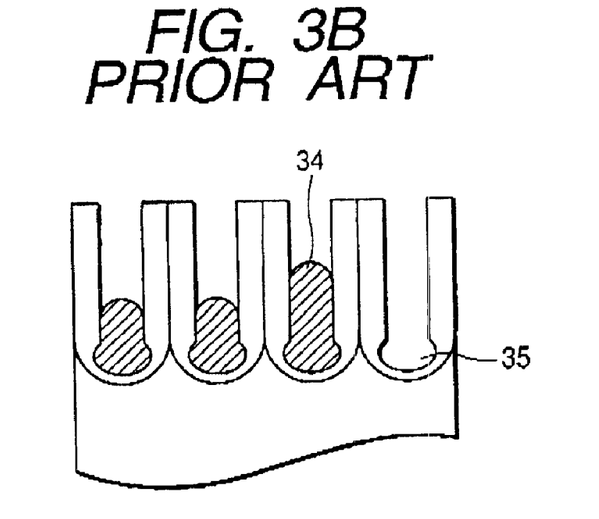

When an aluminum substrate 31 is anodized in an acid electrolyte such as a sulfuric acid, oxalic acid, and phosphoric acid electrolyte, an anodic oxidized film 32 which is a porous anodic oxidized film as shown in FIG. 3A is formed (for example, refer to R. C. Furneaux, W. R. Rigby & A. P. Davidson, "NATURE", vol. 337, p.147 (1989) or the like). The characteristic of this porous film is to have specific geometric structure that extremely fine cylindrical pores (alumina nanoholes 33) whose diameter $2r$ is several nm to several hundreds nm are arranged in parallel at intervals of several tens nm to several hundreds nm ($2R$)). This cylindrical pore has a high aspect ratio, and is also excellent in the uniformity of cross sectional diameters.

In addition, it is possible to control the structure of the porous film to some extent by changing the conditions of anodic oxidation. For example, it is known that it is possible to control to some extent pore intervals with an anodic oxidation voltage, the depth of pores by anodic oxidation time, and diameters of the pores by pore-widening treatment. Here, the pore-widening treatment is the etching of alumina, where wet etching with phosphoric acid is usually used.

In addition, in order to improve the perpendicularity, linearity, and independence of pores in the porous film, a method of two-step anodic oxidation is proposed, that is, the method which produces a porous film having pores exhibiting better perpendicularity, linearity, and independence by performing again anodic oxidation after once removing a porous film formed by performing anodic oxidation ("Japanese Journal of Applied Physics", Vol. 35, Part 2, No. 1B, pp. L126–L129, Jan. 15, 1996). Here, this method uses a phenomenon that hollows of the surface of the aluminum substrate that are formed when the anodic oxide film formed by the first anodic oxidation is removed become starting points for forming the pores of the second anodic oxidation.

Furthermore, in order to improve the controllability of shape, intervals, and a pattern of pores in a porous film, a method of forming starting points of pores with using stamping, that is, a method is also proposed, the method which is for producing a porous film having pores showing the controllability of better shape, intervals, and a pattern by performing anodic oxidation after forming hollows, which are formed by pressing a substrate, having a plurality of projections on its surface, on the surface of an aluminum substrate, as starting points of pores (Japanese Patent Application Laid-Open No. 10-121292 or Masuda, "solid physics" 31, 493 (1996)). In addition, the technology for forming pores that are not honeycomb structure but concentric shape is reported by Okubo et al. in Japanese Patent Application Laid-Open No. 11-224422.

As shown in FIG. 3A, an insulating layer made of thick aluminum oxide is formed in each bottom of the above-described alumina nanoholes 33. Since electrodeposition into nanoholes is difficult if there is this insulating layer, a method of thinning the insulating layer in each bottom of the nanoholes, that Is, a method called an electric current recovery method is generally adopted. The electric current recovery method is a method of thinning the insulating layer in each bottom by gradually lowering an anodic oxidation voltage. However, since each thin insulating layer remains by this method, alternating current electrodeposition with nearly 10 to 50 V of high voltage becomes necessary for the electrodeposition into nanoholes. Since there is limitation in structure control of electrodeposition inclusion objects in the electrodeposition with such a high voltage, polycrystals are usually electrodeposited unevenly. Thus, even if Co is electrodeposited, it is impossible to evenly grow the c-axis, which is an axis where magnetization is easy, in the direction perpendicular to the substrate (refer to "IEEE Trans. Mag." vol. 26, 1635 (1990), and the like). In addition, since the thickness and shape of insulating layers in bottoms of nanoholes are uneven, portions not electrodeposited are apt to arise as shown in FIG. 3B. Referring to FIG. 3B, an electrodeposited magnetic substance is indicated by 34, and an extended portion by 35.

There is much dispersion in the shape of particles, including MPt (M=Co, Fe, Ni), which has Co and $L1_0$ ordered structure, as a component in the above-described conventional recording layer formed by sputtering. It is said that, in a medium for perpendicular magnetic recording, the dispersion of coercivity normalized mainly with saturating magnetization and an average coercivity determines characteristics. Thus, the dispersion of particles in the size of MPt (M=Co, Fe, Ni) microcrystals that have Co and the $L1_0$ ordered structure is reflected in the dispersion of the coercivity of the particles as it is, and deteriorates the characteristics as a recording medium. Of course, the dispersion in orientations of crystallographic axes of the microcrystals is also a cause of the deterioration of the characteristics.

In addition, it is difficult to fill the pores with the above-described alumite magnetic substance, and it is not possible to control the crystal orientation of magnetic substances, and in particular, to control c-axis orientation. Furthermore, it is insufficient to control an amount of electrodeposition inside each pore.

An object of the present invention is to provide a perpendicular magnetic recording medium that has uniform crystal orientation to an anodic oxidation alumina layer, and in particular, the c-axis orientation of Co, a Co alloy, and MPt (M=Co, Fe, and Ni) having the $L1_0$ ordered structure.

In addition, another object of the present invention is to provide a perpendicular magnetic recording medium with good record and reproduction characteristics, in which record particles are shaped like pillars and variations in the shapes thereof are reduced.

Furthermore, still another object of the present invention is to provide an effective backing layer that enhances record and reproduction characteristics.

Moreover, further still another object of the present invention is to provide a method of easily manufacturing the above-described magnetic recording medium, and to provide a magnetic record and reproduction apparatus where the above-described magnetic recording medium is used.

SUMMARY OF THE INVENTION

Namely, a first aspect of the present invention is a magnetic recording medium characterized in that the magnetic recording medium has pores filled with a magnetic substance, a layer mainly made of aluminum oxide having the pores, and a substrate holding the layer mainly made of aluminum oxide, wherein one or more conductive layers are formed between the above-described layer mainly made of aluminum oxide having the pores and the above-described substrate, wherein the conductive layer is a layer which has fcc structure and whose (111) face is oriented in the direction perpendicular to the substrate, and wherein the above-described magnetic substance includes a hard magnetic substance that has hcp structure and is mainly made of Co whose c-axes are perpendicular to the substrate.

In addition, a second aspect of the present invention is a magnetic recording medium characterized in that the magnetic recording medium has pores filled with a magnetic substance, a layer mainly made of aluminum oxide having the pores, and a substrate holding the layer mainly made of aluminum oxide, wherein one or more conductive layers are formed between the above-described layer mainly made of aluminum oxide having the pores and the above-described substrate, wherein the conductive layer is a layer which has fcc structure and whose (001) face is oriented in the direction perpendicular to the substrate, and wherein the above-described magnetic substance includes a hard magnetic substance that has $L1_0$ structure and c-axes oriented in a direction perpendicular to the substrate.

Furthermore, a third aspect of the present invention is a magnetic recording medium characterized in that the magnetic recording medium has pores filled with a magnetic substance, a layer mainly made of aluminum oxide having the pores, and a substrate holding the layer mainly made of aluminum oxide, wherein one or more conductive layers are formed between the above-described layer mainly made of aluminum oxide having the pores and the above-described substrate, wherein the above-described conductive layer has any one of $L1_0$, $L1_1$, and $L1_2$ ordered structure, and a square lattice face of the conductive layer is oriented in a direction perpendicular to the substrate, and wherein the above-described magnetic substance includes a hard magnetic substance that has $L1_0$ structure and c-axes oriented in a direction perpendicular to the substrate.

In addition, a fourth aspect of the present invention is a magnetic record and reproduction apparatus using the above-described magnetic recording medium.

Furthermore, a fifth aspect of the present invention is a method of manufacturing a magnetic recording medium that has a film with anodic oxidized alumina nanoholes filled with a magnetic substance, comprising a step of forming a base electrode layer, which has fcc structure and whose (111) face is oriented in a direction perpendicular to the substrate, and an aluminum layer on a substrate, a step of forming alumina nanoholes by anodizing the aluminum layer, and a step of electrodepositing a hard magnetic substance layer, which is mainly made of Co and has hcp structure, in the alumina nanoholes with orienting the hard magnetic substance layer in the c-axis to the direction perpendicular to the substrate.

Moreover, a sixth aspect of the present invention is a method of manufacturing a magnetic recording medium that has a film with anodic oxidized alumina nanoholes filled with a magnetic substance, comprising a step of forming a base electrode layer, which has fcc structure and whose (001) face is oriented in a direction perpendicular to the substrate, and an aluminum layer on a substrate, a step of forming alumina nanoholes by anodizing the aluminum layer, a step of electrodepositing a hard magnetic substance layer, which has $L1_0$ ordered structure, in each of the above-described alumina nanoholes, and a step of orienting the above-described hard magnetic substance in the c-axis to a direction perpendicular to the substrate.

In addition, a seventh aspect of the present invention is a method of manufacturing a magnetic recording medium that has a film with anodic oxidized alumina nanoholes filled with a magnetic substance, comprising a step of forming a conductive layer, which has any one of $L1_0$, $L1_1$, and $L1_2$ ordered structure, and a square lattice face of which is oriented in a direction perpendicular to the substrate, and an aluminum layer on the substrate, a step of forming alumina nanoholes by anodizing the aluminum layer, a step of electrodepositing a hard magnetic substance layer, which has $L1_0$ ordered structure, in each of the above-described alumina nanoholes, and a step of orienting the above-described hard magnetic substance in the C-axis to a direction perpendicular to the substrate.

BRIEF DESCRIPTION OF THE INVENTION

DETAILED DESCRIPTION OF THE INVENTION

<Structure of a Magnetic Recording Medium>

Figure 1:
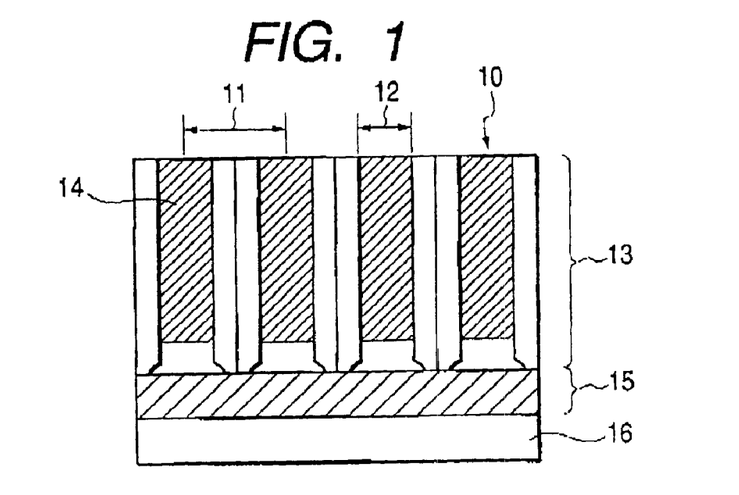
FIG. 1 is a schematic diagram showing an example of an embodiment of a magnetic recording medium according to the present invention.

A magnetic recording medium according to the present invention will be described on the basis of drawings. FIG. 1 is a schematic diagram showing the structure of a magnetic recording medium according to the present invention.

In FIG. 1, reference numeral 10 denotes a nanohole (pore), numeral 11 denotes a nanohole (pore) interval, and numeral 12 denotes a nanohole (pore) diameter. Furthermore, numeral 13 denotes a layer (alumina) mainly made of aluminum oxide, numeral 14 denotes fillers, numeral 15 denotes a base electrode layer (conductive layer), and numeral 16 denotes a substrate (substrate holding the layer 13 mainly made of aluminum oxide).

In the present invention, it is required for high-density recording and sufficient signal detection to fill the alumina nanoholes (pores) 10 with the fillers 14, each of which consists of a hard magnetic substance mainly made of pillar-shaped Co or MPt (M=Co, Fe, Ni) which has $L1_0$ ordered structure. It is preferable that the nanohole diameter 12 is in the range of several nm to several hundred nm, and that an aspect ratio of a nanohole is approximately two to ten. Although a circle, an ellipse, and a rectangle can be used for the cross-sectional shape of each nanohole, it is preferable that cross-sections of respective nanoholes are the same. Furthermore, it is desirable that the shape of each hole of the alumina nanoholes is cylinder-like, and stands linearly and perpendicularly to the base electrode.

For producing the anodic oxidized alumina nanoholes used for a perpendicular magnetic recording medium, it is very effective to use an aluminum anodic oxidation method that is a method of producing nanoholes, aspect ratio of which is large, with sufficient controllability. The term "anodic oxidation" means an oxidization caused at an anode in an acid solution. The nanohole diameter 12 can be controlled from several nm to several hundreds nm in the aluminum anodic oxidation, and in addition, the nanohole interval 11 can be also controlled from a value, a little larger than the nanohole diameter 12, to nearly 500 nm. Although various kinds of acids can be used for the aluminum anodic oxidation, it is preferable to use a sulfuric acid bath for producing nanoholes at small intervals, a phosphoric acid bath for producing nanoholes with comparatively large intervals, and an oxalic acid bath for producing nanoholes therebetween. It is possible to expand the nanohole diameter 12 by etching in a solution such as a phosphoric acid solution after the anodic oxidation.

Figure 5A:
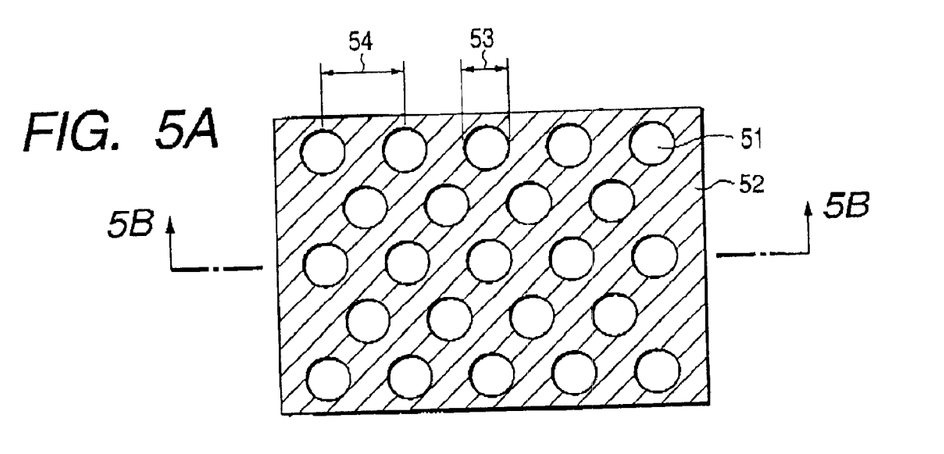
FIGS. 5A, 5B and 5C are schematic diagrams showing comparison between the different orientation of the fillers.

For producing nanoholes regularly, as described above, it is effective to use the method of producing hollows, which become starting points of formation of nanoholes, on an aluminum surface, or the two-step anodic oxidation method. As a nanohole array used for the present invention, it is preferable to be a honeycomb array as shown in FIG. 5A, a rectangular array, or a square array, which is a special case of the rectangular array.

Although aluminum is generally used as the above-described anode-oxidized layer, other elements may be included as long as the layer is mainly made of aluminum and can be anodized. A vacuum deposition method by resistance heating, a sputtering method, CVD, etc. can be used for forming this aluminum layer. However, it is not preferable that the method cannot form a film having a surface flattened to some extent.

Although a vacuum deposition method, a sputtering method, etc. can be used for embedding fillers in the above-described nanoholes, an electrodeposition method is preferable for embedding the fillers in the pores each aspect ratio of which is large. In order to produce a stacked film by the electrodeposition method, it is possible to use a method of performing pulse electrodeposition in a solution containing ions with different electrolytic potentials besides a method of changing electrodeposition liquid in the middle of electrodeposition. The following method can be used. Thus, ions with low electrolytic potentials such as Pt, Cu, and Ni are added in a small ratio to an electrodeposition solution where Co ions with high electrolytic potentials are included. Then, after depositing only the ions with low electrolytic potentials at a low voltage, Co ions with high concentration are deposited at a high voltage. It is also good to perform heat treatment after forming the stacked film by the pulse electrodeposition at the time of forming MPt (M=Co, Fe, Ni) having $L1_0$ ordered structure.

In addition, various kinds of metal can be used as the base electrode layer 15 for the above-described anodic oxidized alumina nanoholes. However, if the base electrode layer has fcc structure, it is preferable to use Pt, Pd, Cu, Ir, Rh, or an alloy thereof, from a viewpoint of electrodeposition controllability for producing a stacked film by the electrodeposition method. In particular, the base metal's (111) face is orientated in a direction perpendicular to the substrate in order to produce Co and a Co alloy, which have hcp structure, in the nanoholes by the electrodeposition with orienting the c-axes of the Co and Co alloy in a direction perpendicular to the substrate. In addition, as long as a range is within the limits where this orientation is obtained, one or more components out of W, Nb, Pt, Si, O, and the like may be also included in addition to Cu that is a principal component. When the base electrode layer has $L1_0$ orderd structure, and the c-axes of which are oriented perpendicular to the substrate, the base electrode's (001) face is oriented in a direction perpendicular to the substrate. And a range of the direction is within the limits where this orientation is obtained, one or more components out of W, Nb, Ti, Si, O, and the like may be also included in addition to Pt, Pd, Cu, Ir and Rh components.

A film may be used as the base electrode, the film which has any one of $L1_0$, $L1_1$ or $L1_2$ ordered structure whose (001) face is oriented in a direction perpendicular to the substrate, and whose square lattice face is oriented in a direction perpendicular to the substrate. Specifically, it is possible to select any one of $L1_0$ whose principal component is MPt (M=Co, Fe, Ni), FePd, TiAl, or CuAu; $L1_1$ whose principal component is CuPt; and $L1_2$ whose principal component is $Cu_3Au$, $Al_3Ti$, $FePd_3$, $Ni_3X$ (X=Fe, Mn, Al), $Pt_3X$ (X=Co, Fe, Mn, Ag, Al), or $PtX_3$ (X=Ag, Au, Fe, Mn, Ni).

In addition, in the present invention, the hcp structure is an abbreviation for hexagonal close-packed structure, and the fcc structure is an abbreviation for face-centered cubic lattice structure (face centered cubic).

Figure 8A:
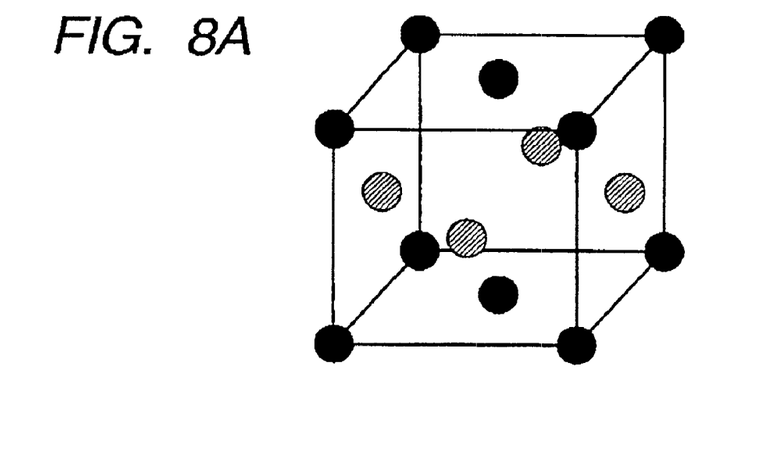
FIGS. 8A, 8B and 8C are schematic diagrams showing the crystal structure of various types of ordered structures.
Figure 8B:
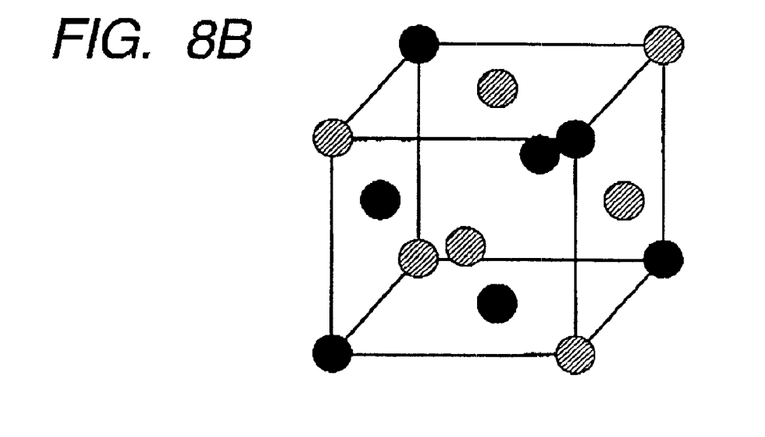
Figure 8C:
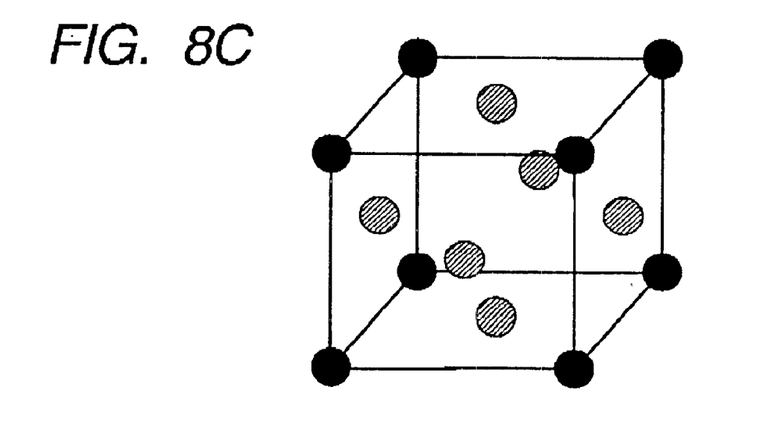

Furthermore, the $L1_0$ ordered structure is the structure shown in FIG. 8A, the $L1_1$ ordered structure is the structure shown in FIG. 8B, and the $L1_2$ ordered structure is the structure shown in FIG. 8C.

Figure 4A:
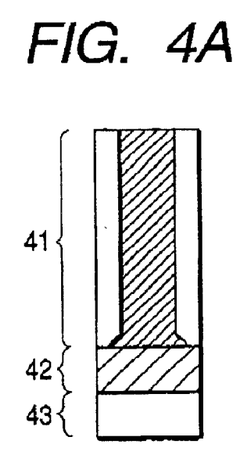
FIGS. 4A, 4B, 4C, 4D and 4E are schematic diagrams relating to fillers in the present invention.
Figure 4B:
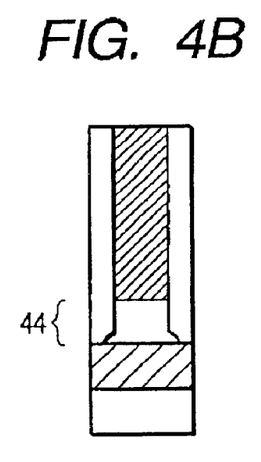
Figure 4C:
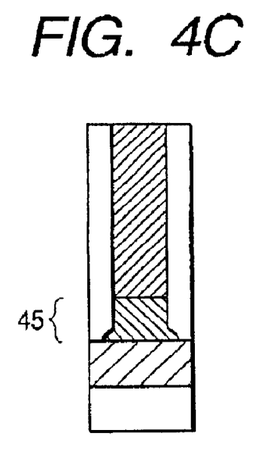
Figure 4D:
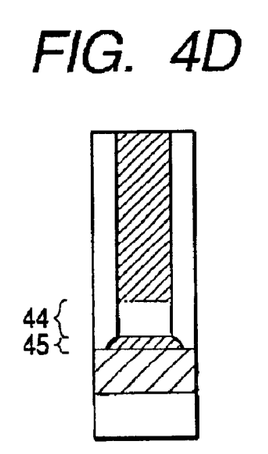

Moreover, the possible structure of the above-described fillers 14 is, from the top to a junction with the base electrode, a hard magnetic substance (FIG. 4A), a hard magnetic substance/a nonmagnetic substance (FIG. 4B), a hard magnetic substance/a soft magnetic substance (FIG. 4C), a hard magnetic substance/a soft magnetic substance/a nonmagnetic substance (FIG. 4E), or a hard magnetic substance/a nonmagnetic substance/a soft magnetic substance (FIG. 4D).

Here, the hard magnetic substance has the hcp structure where the c-axis is oriented in a direction perpendicular to the substrate, and the nonmagnetic substance and soft magnetic substance have the fcc structure where the (111) face is oriented in the direction perpendicular to the substrate. In addition, a hard magnetic substance portion may have Co as a principal component, and may also include one or more components out of Cu, Cr, P, Ni, Pt, and Pd. Furthermore, it is preferable that a nonmagnetic substance portion has fcc structure with having Cu, Pt, Pd, Ir, Rh as a principal component, and the (111) face thereof is oriented in the direction perpendicular to the substrate. Moreover, one or more components out of W, Nb, Si, O, etc. may be also included in addition to Pt, Pd, Cu, Ir, Rh that is a principal component. In addition, the soft magnetic substance portion has NixFe (1-x) as a principal component, and it is desirable that a range of X is 0.65 to 0.91. Furthermore, the soft magnetic substance may also include Co, Cr, P, Pt, Ag, Pd, etc. in part.

Moreover, the hard magnetic substance is characterized in that the hard magnetic substance has the $L1_0$ ordered structure where the c-axis is oriented in the direction perpendicular to the substrate, and that the nonmagnetic substance and soft magnetic substance has the fcc structure where the (001) face is oriented in the direction perpendicular to the substrate. In addition, a hard magnetic substance portion has MPt (M=Co, Fe, Ni) as a principal component, and may include one or more components out of Cu, Cr, P, Ag, and Pd. Furthermore, a nonmagnetic substance portion has Pt, Pd, Cu, Ir, and Rh as principal components with having the fcc structure, and it is preferable that the (001) face is oriented in the direction perpendicular to the substrate. One or more components out of W, Nb, Ti, Si, O, and the like may be also included in addition to Pt, Pd, Cu, Ir and Rh components that are principal ones. In addition, the soft magnetic substance portion has NixFe (1-x) as a principal component, and it is desirable that a range of x is 0.65 to 0.91. Furthermore, the soft magnetic substance may also include Co, Cr, P, Pt, Ag, Pd, etc. in part.

Furthermore, the above-described fillers 14 are made by performing epitaxial growth. This means the growth of the fillers 14 with crystal orientation being kept while being affected by the face (111) of the fcc structure, or the square lattice face of the $L1_0$ ordered structure, $L1_1$ ordered structure, or $L1_2$ ordered structure of the base electrode layer. An example of the square lattice face is (002) face of the $L1_0$ ordered structure. This does not deny the case of not being a single crystal, the case of lattice mismatching with the conductive layer, or the like. Furthermore, it is also possible to highly orient the c-axis of the $L1_0$ ordered structure in the direction perpendicular to the substrate by heat treatment.

In addition, as alumina nanoholes, it is preferable that the nanohole interval 11 and the nanohole diameter 12 are uniform, and that the alumina nanoholes are arranged regularly in a honeycomb or square shape. In particular, this is important when the medium is used as a patterned medium. Furthermore, it is desirable that the shape of each hole of the alumina nanoholes is cylinder-like, and stands linearly and perpendicularly to the base electrode.

As the above-described substrate 16, glass, aluminum, carbon, plastic, Si, etc. can be used. In the case of an aluminum substrate, in order to secure hardness, it is desirable to form a NiP film as a base layer by plating etc. Furthermore, it is preferable to use an MgO substrate or to form an MgO film on the above-mentioned substrate when the square lattice face of a material used as the above-described base electrode layer is oriented in the direction perpendicular to the substrate. In addition, it is also effective to form a soft magnetic layer as a backing layer between the substrate 16 and base electrode layer 15. For backing layer, a film containing NixFe (1-x) as a principal component can be used, and it is desirable that a range of X is 0.65 to 0.91. Furthermore, the soft magnetic substance may also include Co, Cr, P, Pt, Pd, etc. in part. Furthermore, the stacked sequence can be an MgO layer, a soft magnetic backing layer, and a conductive layer from the bottom, or a soft magnetic backing layer, an MgO layer, and a conductive layer. Although it is preferable that the (001) face of the soft magnetic layer is oriented in the case of NixFe (1-x), the soft magnetic layer can be in an amorphous state or another state since other soft magnetic substances can be also adopted.

Figure 7:
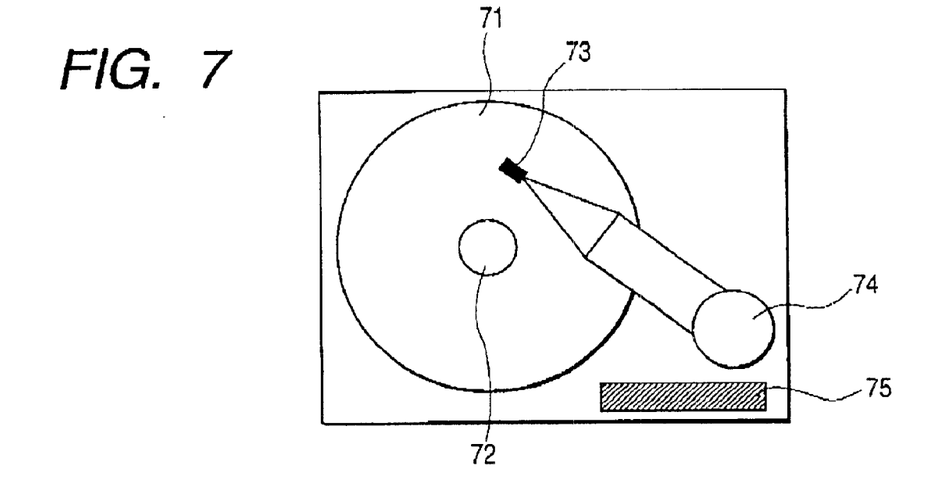
FIG. 7 is a schematic diagram showing a magnetic recording apparatus using a magnetic recording medium according to the present invention.

In addition, a top face of a magnetic recording medium is given precision polishing with using diamond slurry etc., and the Rms (Root mean square) is 1 nm or less. Furthermore, a protection layer can be also formed on the surface, and it is possible to use nonmagnetic substances such as carbide and nitride besides carbon so as to give wear-proof property against friction with a head. In particular, a magnetic recording medium of the present invention is effective as a perpendicular magnetic recording medium. In order to provide a magnetic recording apparatus, it is required to incorporate a read/write head, drive control devices such as a motor, a signal processing circuit, a dust-proof case, and the like in addition to the above-described medium as shown in FIG. 7. Referring to FIG. 7, the magnetic recording medium is indicated by 71, the driving portion for magnetic recording medium by 72, the magnetic head by 73, and the driving portion for magnetic head by 74. However, in a magnetic record and reproduction apparatus, the driving of a magnetic recording medium is not limited to only the rotation and the driving of a magnetic head is not limited to only the slide on a periphery.

EXAMPLES

The present invention will be specifically described with reference to the following examples.

Example 1

This example relates to a manufacturing method and respective shapes and orientation of a hard magnetic substance filling anodic oxidized alumina nanoholes.

A substrate on which a Ti film of 10 nm thick and a Cu film of 20 nm thick, and an aluminum film of 500 nm thick had been formed on Si substrate by sputtering was anodized by applying 40 V in 0.3 M of oxalic acid aqueous solution at 16° C. Next, the substrate was immersed for 25 minutes in 0.5 wt % of phosphoric acid aqueous solution for expanding hole diameters. At this time, the (111) face of the Cu film was oriented in the direction perpendicular to the substrate, and since a Cu face was exposed in each nanohole bottom, the Cu film had good conductivity.

The anodic oxidized alumina nanoholes thus produced was filled with Co, which is a hard magnetic substance. Here, an aqueous solution that consists of cobalt sulfate (II) heptahydrate of 0.2 M and boric acid of 0.3 M was used at 24° C. for the electrodeposition of Co.

The electrodeposition was performed in the above-described solution with using Ag/AgCl as a reference electrode in each case of −2.0 V, −1.5 V, and −1.0 V. Furthermore, the electrodeposited materials that overflowed on the surface were ground and removed from these samples with using the diamond slurry of ¼ μm. At this time, surface Rms was 1 nm or less.

When the above samples were observed with an FE-SEM, the fillers exist in all nanoholes. It was verified that the linearity of nanoholes was also excellent through the observation from cross sections.

Furthermore, the results of X-ray diffractometry of the samples produced are shown in the following Table 1. A sample S was powder, whose data was derived from JCPDS cards. The intensity ratios are ratios of integrated intensities.

TABLE 1

|  | Sample S | Sample A | Sample B | Sample C |
|---|---|---|---|---|
| Applied Voltage (vs Ag/AgCl) |  | −2.0 V | −1.5 V | −1.0 V |
| X-ray diffraction intensity ratio (002)/(101) | 0.6 | 0.61 | 1.28 | 5.31 |
| X-ray diffraction intensity ratio (100)/(101) | 0.2 | 0.08 | 0.12 | 0.73 |

As the result of X-ray diffractometry of the samples filled with Co, it was verified that the (002) diffraction intensity increases in the direction perpendicular to the substrate by lowering an applied voltage, and c-axes of samples A to C proceeded to be oriented. It is conceivable that the slower deposition velocity of the fillers is better from the viewpoint of voltage dependency, the deposition velocity that can be estimated to be almost 3 nm/sec.

As described above, it is possible to form the fillers with high orientation into nanoholes when velocity is slow.

Example 2

This example relates to the formation of an alloy of Co and Cu by mixing the electrodeposition liquid in Example 1 and a copper sulfate (II) aqueous solution.

First, similarly to Example 1, the alumina nanoholes were prepared.

An aqueous solution that a copper sulfate (II) pentahydrate of 0.01 M was mixed with an aqueous solution, which consists of cobalt sulfate (II) heptahydrate of 0.2 M and boric acid of 0.3 M, in a 1:1 ratio was used at 24° C. for the electrodeposition.

The electrodeposition was performed with applying −1.0 V to the Ag/AgCl reference electrode.

Then, electrodepositions overflowed on the surface were removed by polishing, and X-ray diffractometry and magnetization measurement were performed.

As the result of X-ray diffraction, it was verified that the c-axes of electrodepositions are oriented dominantly.

Furthermore, although the saturation magnetization of this ample decreased to 680 (emu/cc) than the case of only Co according to magnetization measurement at 24° C., the remanence ratio of the magnetic hysteresis curve in the direction perpendicular to the substrate became good to 0.94, which was improved by 5%.

As described above, the effects by alloying of Co were found.

Example 3

This example relates to a manufacturing method and orientation of a nonmagnetic substance and soft magnetic substance portions in the structure of fillers, and the orientation of a hard magnetic substance portion caused by the result.

Figure 4E:
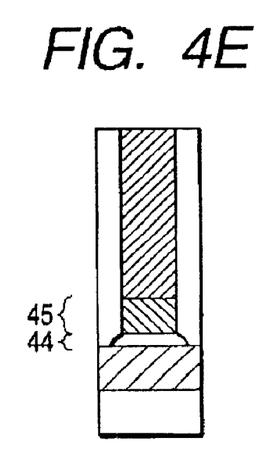

First, possible structure of the fillers, as shown in FIGS. 4A to 4E, is not only a hard magnetic substance only in Example 1 (FIG. 4A), but also a hard magnetic substance/a nonmagnetic substance (FIG. 4B), a hard magnetic substance/a soft magnetic substance (FIG. 4C), a hard magnetic substance/a nonmagnetic substance/a soft magnetic substance (FIG. 4D), or a hard magnetic substance/a soft magnetic substance/a nonmagnetic substance (FIG. 4E). Referring to FIGS. 4A to 4E, the hard magnetic substance is indicated by 41, the base electrode layer by 42, the substrate by 43, the nonmagnetic substance portion by 44, and the soft magnetic substance portion by 45.

First, as shown in Example 1, the alumina nanoholes were prepared, and the electrodeposition was performed in cases that a nonmagnetic substance layer and a soft magnetic substance layer were formed independently or stacked together.

Cu was adopted as the nonmagnetic substance, and with using an aqueous solution that consists of copper sulfate (II) pentahydrate, sulfuric acid, and thio uric acid, the electrodeposition was performed at 24° C. with applying a voltage of −0.5 V to the Ag/AgCl reference electrode.

NiFe was adopted as the soft magnetic substance, and with mixing nickel sulfate (II) heptahydrate with ferrous sulfate (II) heptahydrate in a 1:1 ratio, the electrodeposition was similarly performed at 24° C. with applying a voltage of −1.0 V to the Ag/AgCl reference electrode.

In addition, samples that are formed by stacking two kinds of layers, that is, samples consisting of a nonmagnetic substance/a soft magnetic substance, and a soft magnetic substance/a nonmagnetic substance respectively were produced in separate baths under the above described conditions.

In addition, it becomes possible to stack layers without changing an electrodeposition liquid by performing the electrodeposition with applying −0.5 V to the Ag/AgCl reference electrode for the nonmagnetic substance layer and applying −1.0 V for the soft magnetic substance layer in a mixed bath where an electrodeposition liquid of Cu is mixed with an electrodeposition liquid of NiFe in a 1:10 ratio. However, it cannot be avoided that a small amount of another component is mixed.

The result of X-ray diffraction of the samples described above is shown in Table 2. When Cu and NiFe were intermingled, the diffraction intensity ratio of a material near a sample surface was computed.

TABLE 2

|  | Comparative example for Cu | Comparative example for NiFe | Cu only | NiFe only | Cu/NiFe | NiFe/Cu | Cu/NiFe Mixed bath | NiFe/Cu Mixed bath |
| --- | --- | --- | --- | --- | --- | --- | --- | --- |
| Applied voltage (vs Ag/AgCl) | −2.0 V | −3.1 V | −0.5 V | −1.0 V |  |  |  |  |
| X-ray diffraction Intensity ratio (002)/(202) | 2.4 | 2.3 | 1.0 | 2.1 | 1.2 | 1.9 | 1.3 | 2.2 |
| X-ray diffraction Intensity ratio (111)/(202) | 6.4 | 4.5 | 911 | 680 | 865 | 713 | 844 | 685 |

Here, the Cu and NiFe comparative examples were samples at the time of applying the above-described voltages, and it is conceivable that the samples are approximately powder.

From the above, it was verified that both Cu and NiFe have the fcc structure and their (111) faces are oriented in the direction perpendicular to the substrate. In addition, when layers were stacked, the tendency of the orientation did not change regardless of the sequence to be good. Also in the electrodeposition in the mixed bath of the nonmagnetic substance and soft magnetic substance, it was verified that the (111) face was oriented in the direction perpendicular to the substrate. It is possible to estimate the orientation at about 98.5% in the sample where only Cu is electrodeposited.

Furthermore, the result of X-ray diffraction at the time of adding Co, which is a hard magnetic substance, to the last layer on the conditions obtained above is shown in Table 3. The conditions under which the c-axis was mostly orientated in Example 1 were used as electrodeposition conditions of Co.

TABLE 3

|  | Comparative example for Co | Cu only | NiFe only | Cu/NiFe | NiFe/Cu | Cu/NiFe mixed bath | NiFe/Cu mixed bath |
| --- | --- | --- | --- | --- | --- | --- | --- |
| Applied voltage (vs Ag/AgCl) | −1.0 V | −1.0 V | −1.0 V | −1.0 V | −1.0 V | −1.0 V | −1.0 V |
| X-ray diffraction Intensity ratio (002)/(101) | 5.31 | 53.1 | 42.0 | 46.2 | 44.3 | 47.0 | 41.6 |
| X-ray diffraction Intensity ratio (100)/(101) | 0.73 | 0.80 | 0.84 | 0.76 | 0.77 | 0.79 | 0.81 |

Here, a Co comparative example expresses an example where the c-axis was mostly oriented in Example 1.

As described above, in the structure of the fillers, it was verified that a nonmagnetic substance and soft magnetic substance layer had large influence also on the c-axis orientation of a hard magnetic substance layer. Probably, it is expected that Cu (111) face of the base electrode layer is oxidized in part after anodic oxidation. Hence it is conceivable that the orientation in a following layer was improved by covering this face with a material having the same crystal structure.

Example 4

This example relates to a soft magnetic layer configured under a base electrode layer.

First, a NiFe soft magnetic layer was formed at the thickness of 1 μm to 10 μm on a Si substrate by sputtering. Then, when surface roughness is observed by AFM (Atomic Force Microscope), planarity becomes better as a thickness becomes thinner. However, it is preferable from a role of a backing layer of a recording medium that the film thickness is from 2 μm to 5 μm.

After formation of the NiFe layer, the Cu base electrode was formed, and it verified from X-ray diffraction that the (111) face was oriented in the direction perpendicular to the substrate. Furthermore, in regard to the cases that the thickness of the NiFe layer is 2 μm, 3 μm, and 5 μm, anodic oxidation was performed at 16° C. in an oxalic acid bath with applying 40 V after formation of the aluminum film. When its cross sections were observed by FE-SEM (field emission type scanning electron microscope), the bottom of the nanoholes was uniform like the case where there were no NiFe layers.

From the above, it is possible to insert the NiFe soft magnetic substance layer under the base electrode layer.

Example 5

This example relates to MFM (magnetic force microscope) observation of a hard magnetic substance, Co having hcp structure.

First, Co, where the c-axis of 96.4% of Co was oriented in Example 3, and the alumina nanoholes where the c-axes were evenly distributed in Example 1 are prepared. At this time, a nanohole diameter 53 was 50 nm and a nanohole interval 54 was 100 nm, and the nanoholes were arranged regularly in a honeycomb shape as shown in the plan of FIG. 5A. Each of FIGS. 5B and 5C means a section taken on line 5B—5B in FIG. 5A. Referring FIGS. 5A to 5C, a recording portion is indicated by 51, and a portion comprised of alumina by 52. It was verified that the pillar-like fillers that were perpendicular to the substrate and consisted of Co were uniformly formed according to the shape observation of their top faces and cross sections with a FE-SEM.

Magnetization measurement was performed for the above samples in 27° C. in a range of −5000 (Oe) to 5000 (Oe). Consequently, remanence ratios (Mr/Ms) of magnetized hysteresis curves in the direction perpendicular to the substrate were 0.96 and 0.83 respectively, and the sample in which the c-axes of Co were oriented showed a better value.

Furthermore, the observation of these was performed with an MFM.

Figure 5B:
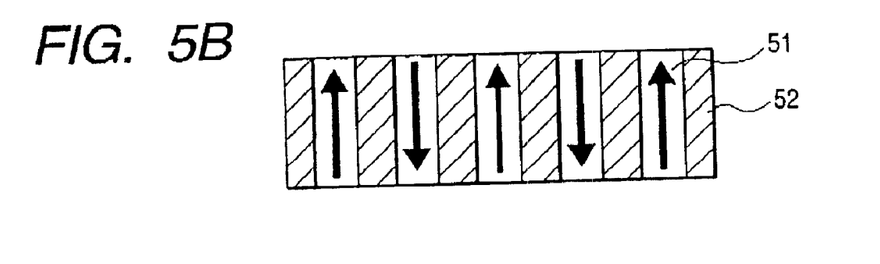
Figure 5C:
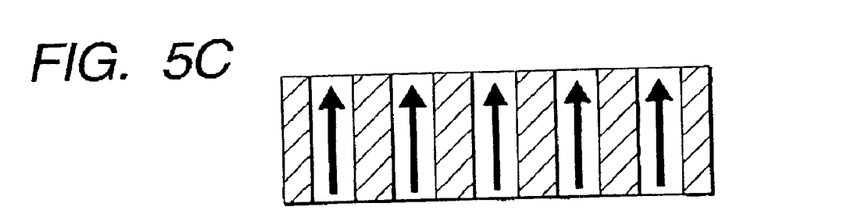

First, according to the observation after aligning the direction of magnetization by applying a magnetic field of 3000 (Oe) in one direction, in the case of the sample in which Co was oriented along the c-axis, an image showing that all fillers were magnetized in the same direction was obtained as shown in FIG. 5C. Conversely, in the case of the sample over which directions of the c-axes were distributed uniformly, an image where the direction of magnetization was inverted in about 12% of observation range (10 μm² range) was observed as shown in FIG. 5B.

Furthermore, writing was performed in the sample where the c-axes of Co were oriented by applying 800 (Oe) of magnetic field intermittently in a reverse direction in a state that magnetization was aligned in one direction and scanning the sample at fixed velocity with an MFM probe having high permeability. Consequently, it was verified that the magnetization of only the portion, corresponding to the time when the magnetic field was applied, from among the range which the MFM probe scanned was inverted. At this time, it was possible to perform recording in each nanohole of the sample with a nanohole interval of 100 nm. In addition, in the range of 10 μm², a record pattern was not changed even after 10 hours exposure in 26° C. Thus, since it is possible to perform writing in each nanohole, this can be used as a patterned medium.

Finally, writing was performed in the sample with a nanohole interval of 35 nm similarly to the above. Consequently, it was found that writing in each nanohole was unsuccessful since the MFM probe was much large, but writing was performed in about six to eight nanoholes at a time as a group in result of calculation from the range of the image obtained. Thereby, it was verified that it was also possible in writing to perform recording in a plurality of nanoholes unlike the above-described recording in each nanohole. In this case, it was also verified that it was not necessary that the nanoholes were arranged regularly.

Thus, it was verified that, by orienting the c-axes of Co, not only shape but also magneto crystalline anisotropy can be used effectively, and that it is possible to suppress the inversion of adjacent nanoholes in the hard magnetic substance due to interaction, and stabilization thereof. Furthermore, it was also verified to retain record.

Example 6

This example relates to S/N characteristics in a magnetic record and reproduction output, and the like. This was performed with using a magnetic recording apparatus having the structure as roughly shown in FIG. 7.

A single magnetic pole head having the recording track width of 1.0 μm and the main pole thickness of 0.12 μm was used for recording on a perpendicular magnetic recording medium. An MR head with the recording track width of 0.2 μm was used for reproduction of a signal. In addition, the head flying height at the time of record and reproduction was set to be about 15 nm, and the record and reproduction characteristic of the medium were measured.

Figure 6A:
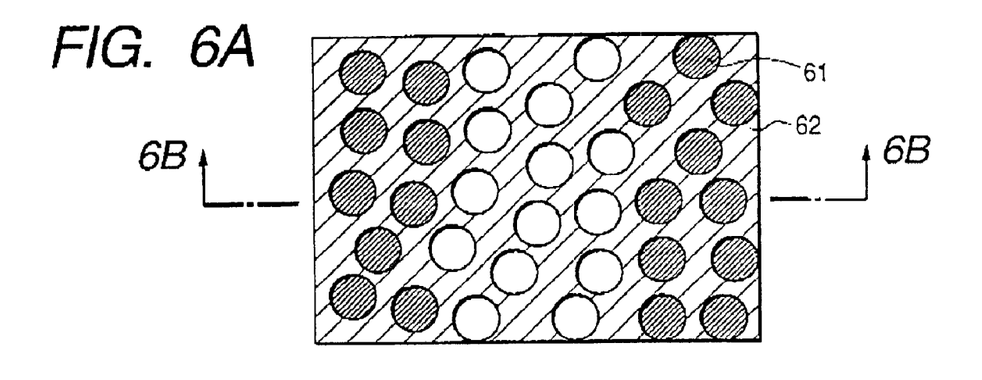
FIGS. 6A and 6B are schematic diagrams showing states of the magnetic recording medium after magnetic recording.
Figure 6B:
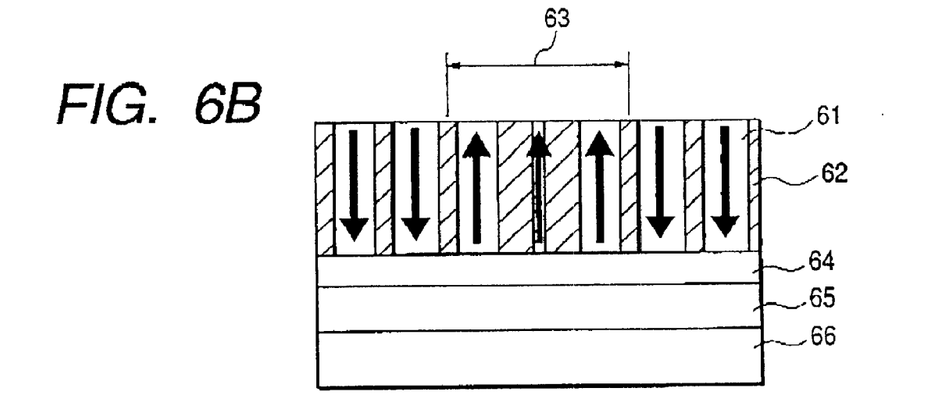

Samples prepared for measurement were a sample where 96.4% of c-axes of Co hard magnetic substance in the nanoholes shown in Example 3 were oriented (sample X), a sample where directions of the c-axes in Example 1 were distributed uniformly (sample Y), and also a sample where the c-axes were oriented and 3 μm of NiFe layer was formed as a backing layer 65 (FIG. 6B) under the base electrode (sample Z). In addition, as shown in FIGS. 6A and 6B, a nanohole diameter is 20 nm, and a nanohole interval is about 35 nm. FIG. 6B means a section taken on line 6B—6B in FIG. 6A. Referring FIGS. 6A and 6B, a recording portion is indicated by 61, a portion comprised of alumina by 62, a region of one bit by 63, a base electrode layer by 64, and a substrate by 66.

The measurement result of these samples is summarized in Table 4. C-axis orientation was computed from the comparison with X-ray diffraction intensity ratio of a powder sample.

TABLE 4

|  | Sample X | Sample Y | Sample Z |
|---|---|---|---|
| c-axis orientation degree | 96.4% | 83.4% | 92.3% |
| NiFe backing layer | No | No | Yes |

TABLE 4-continued

|  | Sample X | Sample Y | Sample Z |
| --- | --- | --- | --- |
| S/N relative value | 2.21 | 1.00 | 1.95 |
| Error rate | $1.0 \times 10^{-8}$ | $1.0 \times 10^{-5}$ | $4.0 \times 10^{-9}$ |

Thus, in record to and reproduction from the hard magnetic substance where the c-axes in the regular nanoholes are oriented, the volume, shape, and magneto crystalline anisotropy of hard magnetic substances of respective nanoholes that serve as recording portions in FIG. 6A are uniform. Hence noise is very low, and therefore, an S/N relative value is good. In addition, it was verified that, although a noise level slightly increased owing to formation of the backing layer, the S/N relative value was good and there was no problem of rewriting adjacent portions at the time of recording. A medium having such a small nanohole diameter and a small nanohole interval can perform perpendicular recording as one bit in a plurality of nanoholes as shown in FIGS. 6A and 6B. Hence this demonstrates the possibility as a future perpendicular magnetic recording apparatus.

Example 7

Samples were prepared, the sample each of which separately has a 10 nm-thick Pt, Pd, Cu, Ir, or Rh film on an MgO substrate by a sputter vacuum deposition. Then, an aluminum film of 500 nm thick was formed on all the samples. Furthermore, anodic oxidation was performed at 16° C. in 0.3 M of oxalic acid aqueous solution with applying 40 V of voltage. Next, the substrates were dipped for 25 minutes in 0.5 wt % of phosphoric acid aqueous solution for expanding hole diameters. At this time, the Pt, Pd, Cu, Ir, and Rh films were oriented respectively to the (001) face to the direction perpendicular to the substrate. Hence, in each nanohole bottom, the Pt, Pd, Cu, Ir, or Rh surface was exposed to make conductivity good.

Thus, the nanoholes of the sample whose conductive layer was Pt, as a typical example, was filled with CoPt, which is a hard magnetic substance. Here, the composition of an aqueous solution used at 24° C. for the electrodeposition of CoPt was hydrogen hexachloroplatinate(IV) 6-hydrate solution of 0.003 mol/l, cobalt sulfate (II) heptahydrate 0.3 mol/l, boric acid of 30 g/l, and magnesium sulfate heptahydrate of 50 g/l.

The electrodeposition was performed in the above-described solution with using Ag/AgCl as a reference electrode in each case of −1.5 V, −0.8 V, and −0.6 V.

Furthermore, the electrodeposited materials that overflowed on the surface were ground and removed from these samples with using the diamond slurry of ¼ μm. At this time, surface Rms was 1 nm or less.

When the above samples were observed with a field emission type scanning electron microscope (FE-SEM), the fillers exist in all nanoholes. It was verified that the linearity of nanoholes was also excellent through the observation from cross sections.

The result of performing component analysis with these ICPs is shown in Table 5. This composition includes also Pt of the electrode layer. In this case, it is sufficient for this composition to include an electrode layer for becoming spread and uniform after heat treatment.

TABLE 5

|  | −0.6 V | −0.8 V | −1.5 V |
| --- | --- | --- | --- |
| Co composition | 0.06 | 0.52 | 0.95 |
| Pt composition | 0.94 | 0.48 | 0.05 |

From the above, the composition of Co was low in the sample electrodeposited at −0.6 V. In addition, the composition of Co was large enough in the sample electrodeposited at −1.5 V, which was greatly shifted from the composition of CoPt with the $L1_0$ ordered structure. In the sample at −0.8 V, the diffraction of fcc:CoPt (002) was mainly observed.

X-ray diffractometry of the sample electrodeposited at −0.8 V was performed again after sufficient annealing in a 650° C. reducing atmosphere. Then, a peak of CoPt (002) with the $L1_0$ ordered structure could be observed in the sample electrodeposited at −0.8 V. With calibrating this by the diffraction intensity ratio of the powder sample listed in JCPDS, 78% of the whole c-axes were oriented in the direction perpendicular to the substrate, and the remainders were in other directions. In addition, CoPt (111) with the $L1_0$ ordered structure appears preferentially when the electrode layer is a Pt (111) face. Hence, it can be verified that the c-axes of CoPt with the $L1_0$ ordered structure are oriented preferentially in the direction perpendicular to the substrate by making the electrode layer a Pt (001) face.

Example 8

In this example, the measurement similar to that of Example 7 in the case where an electrode layer has ordered structure.

First, samples prepared were those where a 10 nm-thick CoPt film with $L1_0$ ordered structure, a 10 nm-thick CuPt film with $L1_1$ ordered structure, or a 10 nm-thick $CoPt_3$ with $L1_2$ ordered structure were formed on each MgO substrate. After that, an Al film of 500 nm thick was formed on each sample.

These three samples were anodized under the same conditions as those in Example 7. It was verified that similarly to the Pt electrode layer, since a square array face was oriented in the direction perpendicular to the substrate, and hence conductivity was good since a face of each conductive layer was exposed in the bottom of a nanohole. In particular, it was verified that the c-axes were oriented in the direction perpendicular to the substrate in the case of the $L1_0$ ordered structure.

As described above, the nanoholes was filled with CoPt, which is a hard magnetic substance, if the conductive layer has the $L1_0$ ordered structure. Here, the composition of an aqueous solution used at 24° C. for the electrodeposition of CoPt was hydrogen hexachloroplatinate(IV) 6-hydrate solution of 0.003 mol/l, cobalt sulfate (II) heptahydrate 0.3 mol/l, boric acid of 30 g/l, and magnesium sulfate heptahydrate of 50 g/l.

The electrodeposition was performed at −0.8 V in the above solution with using Ag/AgCl as a reference electrode. Although the Co composition became larger than the composition in Example 7 because Co was included in the electrode layer, Co was few enough in comparison with an amount of electrodeposition. Hence there was hardly shifted on composition, and this was the composition of forming CoPt with the $L1_0$ ordered structure. Furthermore, the electrodeposited materials that overflowed on the surface were ground and removed from these samples with using the diamond slurry of ¼ μm. At this time, surface Rms was 1 nm or less.

In result of X-ray diffraction measurement, a peak of fcc-CoPt (002) was mainly observed. X-ray diffractometry of these samples was performed again after sufficient annealing in a 650° C. reducing atmosphere. Then, a peak of CoPt (002) with the $L1_0$ ordered structure was observed. With calibrating this by the diffraction intensity ratio of the powder sample listed in JCPDS, 84% of the whole c-axes were oriented in the direction perpendicular to the substrate.

Hence, it can be verified that the c-axes of CoPt with the $L1_0$ ordered structure are oriented preferentially in the direction perpendicular to the substrate also when CoPt with the $L1_0$ ordered structure is used as the electrode layer.

Example 9

This example relates to a manufacturing method and orientation of a nonmagnetic substance and soft magnetic substance portions in the structure of fillers, and the orientation of a hard magnetic substance portion caused by the result.

First, possible structure of the fillers, as shown in FIGS. 4A to 4E, is not only a hard magnetic substance only in Example 7 (FIG. 4A), a hard magnetic substance/a nonmagnetic substance (FIG. 4B), a hard magnetic substance/a soft magnetic substance (FIG. 4C), a hard magnetic substance/a nonmagnetic substance/a soft magnetic substance (FIG. 4D), or a hard magnetic substance/a soft magnetic substance/a nonmagnetic substance (FIG. 4E).

First, five types of alumina nanoholes which adopted Pt, Pd, Cu, Ir, and Rh as respective conductive layers were prepared as shown in Example 7. The electrodeposition was performed in cases that a nonmagnetic substance layer and a soft magnetic substance layer were formed independently or stacked together. Consequently, it was verified that the orientation after the electrodeposition was kept as the conductive layer was, and the layer was oriented to the (001) face.

In particular, in this example, the case that a conductive layer is Pt will be described in detail.

First, so as to perform electrodeposition of Pt as the nonmagnetic substance, with using an aqueous solution of 0.03 mol/l that consists of platinum chloride hexahydrate, the electrodeposition was performed at 24° C. with applying a voltage of –0.5 V to the Ag/AgCl reference electrode.

NiFe was adopted as the soft magnetic substance, and with mixing nickel sulfate (II) heptahydrate with ferrous sulfate (II) heptahydrate in a 1:1 ratio, the electrodeposition was similarly performed at 24° C. with applying a voltage of –1.0 V to the Ag/AgCl reference electrode.

In addition, samples that are formed by stacking two kinds of layers, that is, samples consisting of a nonmagnetic substance/a soft magnetic substance, and a soft magnetic substance/a nonmagnetic substance respectively were produced in separate baths.

In addition, it becomes possible to perform stacking without changing the electrodeposition liquid with applying –0.5 V to the Ag/AgCl reference electrode for the nonmagnetic substance layer, and with applying –1.0 V for the soft magnetic layer in a mixed bath where the above-described electrodeposition liquid of Pt and NiFe was mixed in a 1:10 ratio. However, it cannot be avoided that a small amount of another component is mixed.

According to the result of X-ray diffraction of the above samples, the single Pt layer was most oriented to the fcc (001) face in the direction perpendicular to the substrate most. Hence it can be verified that 94% of Pt is oriented with calibrating it with diffraction intensity from the powder sample listed in JCPDS. In addition, it can be verified that 80% or more of the whole magnetic substance is oriented to the fcc (001) to the direction perpendicular to the substrate in every sample which is combined, especially is given the electrodeposition in the mixed bath.

Furthermore, the result of X-ray diffraction at the time of adding CoPt, which is a hard magnetic substance, to the last layer under the conditions obtained above is shown in Table 3. The electrodeposition conditions of CoPt are –0.8 V at which maximum orientation was obtained in Examples 7 and 8, and after that, the samples were heated at 650° C. for 2 minutes in an RTA. This is for suppressing counter diffusion with the non-magnetic or soft magnetic layer.

The ratio of the above result when setting a comparative example to 1 with making the degree of the orientation of CoPt with the $L1_0$ ordered structure to the (002) face in Example 7 as the Comparative Example is shown in Table 6.

TABLE 6

| Comparative example | Pt only | NiFe only | Pt/NiFe | NiFe/Pt | Pt/NiFe mixed bath | NiFe/Pt mixed bath |
|---|---|---|---|---|---|---|
| 1 | 1.18 | 1.11 | 1.05 | 1.06 | 1.02 | 1.02 |

Thus, in the structure of the fillers, it was verified that a nonmagnetic substance and soft magnetic substance layer had influence also on the c-axis orientation of a hard magnetic substance layer. Probably, it is expected that Pt (001) face of the conductive layer is oxidized in part after anodic oxidation. Hence it is conceivable that the orientation in a following layer was improved by covering this face with a material having the same crystal structure. In addition, the same effect can be also obtained in other conductive layers.

Example 10

This example relates to a soft magnetic layer configured under a conductive layer.

A Pt electrode layer was formed after forming a NiFe layer on an MgO (001) face. Then, it could be verified from X-ray diffraction that the (001) face of a Pt electrode layer was oriented in the direction perpendicular to the substrate. Furthermore, anodic oxidation was performed at 16° C. in an oxalic acid bath with applying a voltage of 40 V after further forming a NiFe layer of 2 μm thick and forming an Al film. Then, when its cross sections were observed by FE-SEM (field emission type scanning electron microscope), the bottoms of the nanoholes were uniform like the case where there were no NiFe layers.

Moreover, Pt electrodeposition was performed and recording was performed by contacting a magnetic head after CoPt formation with the $L1_0$ ordered structure. At this time, with comparing the result with the sample not having the soft magnetic layer under the conductive layer, intensity of magnetic field for recording was 0.76 times. Hence it could be verified that magnetic flux concentration was promoted by the soft magnetic layer.

From the above, it is effective to intercalate a NiFe soft magnetic substance layer under a conductive layer.

Example 11

This example relates to MFM (Magnetic Force Microscope) observation of a hard magnetic substance, CoPt having $L1_0$ ordered structure.

First, a Pt electrodeposition step was performed in condition of Example 9. Thus, alumina nanoholes filled with CoPt with the $L1_0$ ordered structure, which was oriented 1.18 times as many as the comparative example, and CoPt with the $L1_0$ ordered structure, where the c-axes were uniformly distributed over all directions, were prepared. At this time, a nanohole diameter was 50 nm and a nanohole interval was 100 nm, and the nanoholes were arranged regularly in a honeycomb shape as shown in the plan of FIG. 5A. It was verified that the pillar-like fillers that were perpendicular to the substrate and consisted of CoPt with the $L1_0$ ordered structure were uniformly formed according to the shape observation of their top faces and cross sections with a field emission type scanning electron microscope (FE-SEM).

Magnetization measurement was performed for the above samples in 27° C. in a range of −25000 (Oe) to 25000 (Oe). Consequently, remanence ratios (Mr/Ms) of magnetized hysteresis curves in the direction perpendicular to the substrate were 0.91 and 0.74 respectively, and the sample in which the c-axes of CoPt with the $L1_0$ ordered structure were oriented showed a better value.

Furthermore, the observation of these was performed with an MFM.

First, the samples were observed after applying the magnetic field of 25000 (Oe) in one direction and sufficiently aligning the direction of magnetization. Then, from the sample in which the c-axes of CoPt with the $L1_0$ ordered structure were oriented, an image showing that all fillers were oriented in the same direction as shown in FIG. 5C was obtained. When observing again two days after, the direction of magnetization was kept in all fillers. Conversely, it was conceivable that the sample where the c-axes were distributed uniformly was in a magnetization state as shown in FIG. 5B. Owing to the magnetic coupling with adjacent magnetized fillers, a leakage magnetic field was weak, measurement was difficult, and magnetic contrast was hardly obtained. This is conceivable that the c-axes were also oriented in the direction parallel to the substrate's surface, and hence, the magnetic field was closed inside over the whole film.

In addition, with observing the sample after applying the magnetic field of 25000 (Oe) in the opposite direction to reverse the direction of magnetization, an image with a contrast contrary to the image previously observed was obtained. Hence, in the film of CoPt with the $L1_0$ ordered structure where the c-axes were oriented in the direction perpendicular to the substrate, it can be verified the possibility as a perpendicular magnetic medium. However, it is also possible to lower the intensity of the magnetic field required for magnetization reversal by mixing a minute amount of another element.

Thus, it was verified that, by orienting the c-axes of CoPt with the $L1_0$ ordered structure, not only shape but also magneto crystalline anisotropy can be used effectively, and that it is possible to suppress the inversion of adjacent nanoholes in the hard magnetic substance due to interaction, and stabilization thereof. Furthermore, it was also verified to retain record.

Example 12

In this example, a magnetic recording apparatus configures as roughly shown in FIG. 7 can be configured.

As attempted in Example 11, in the recording medium according to the present invention, it is possible to align the magnetizing direction of fillers by applying a magnetic field, and also to retain information. Hence, it is also possible to record information of one bit by the magnetizing direction of countless fillers by sufficiently reducing each size of fillers to 10 nm or less. Alternatively, although the size is about 25 nm, it is also possible to record information of one bit on single filler. Then, it is possible to form a magnetic recording apparatus by assembling a recording medium according to the present invention, a magnetic recording medium driving unit, a magnetic head, a magnetic head driving unit, and a signal processing unit, into an apparatus as shown in FIG. 7. However, according to this example, the driving of a magnetic recording medium is not limited to only the rotation and the driving of a magnetic head is not limited to only the slide on a periphery.

What is claimed is:

1. A magnetic recording medium, in which an aluminum oxide layer having holes on a substrate is filled with a magnetic substance, comprising:

at least one conductive layer between the aluminum oxide layer and the substrate, wherein the conductive layer has any one of $L1_0$, $L1_1$, and $L1_2$ ordered structures, and its square array face is oriented in a direction perpendicular to the substrate, and the magnetic substance includes a hard magnetic substance that has the $L1_0$ structure and the c-axes of which are oriented in the direction perpendicular to the substrate, and a soft magnetic substance layer is formed under the conductive layer.

* * * * *